United States Patent
Rice

(12) 
(10) Patent No.: US 6,598,478 B2
(45) Date of Patent: Jul. 29, 2003

(54) MICRO-DOPPLER MICROSCOPE

(75) Inventor: Robert R. Rice, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 102 days.

(21) Appl. No.: 10/052,979

(22) Filed: Nov. 9, 2001

(65) Prior Publication Data

US 2003/0089174 A1 May 15, 2003

(51) Int. Cl.[7] .......................... G01N 29/04; G01C 3/08; C12M 1/34
(52) U.S. Cl. ..................... 73/655; 73/657; 73/800; 356/28.5; 435/288.7
(58) Field of Search .................... 73/655, 657, 596, 73/800; 356/486, 28.5, 477, 5.09, 482; 435/288.7

(56) References Cited

U.S. PATENT DOCUMENTS

| | | | | |
|---|---|---|---|---|
| 4,669,876 A | * | 6/1987 | Dopheide | 356/28.5 |
| 4,975,237 A | * | 12/1990 | Watling | 356/338 |
| 5,023,845 A | * | 6/1991 | Crane et al. | 73/800 |
| 5,546,187 A | * | 8/1996 | Pepper et al. | 356/487 |
| 5,585,921 A | * | 12/1996 | Pepper et al. | 356/487 |
| 5,847,816 A | | 12/1998 | Zediker et al. | 356/5.09 |
| 5,847,817 A | | 12/1998 | Zediker et al. | 356/5.09 |
| 5,864,393 A | * | 1/1999 | Maris | 356/28 |
| 5,867,257 A | | 2/1999 | Rice et al. | 356/28.5 |
| 6,320,665 B1 | * | 11/2001 | Ngoi et al. | 356/485 |
| 6,388,739 B1 | * | 5/2002 | Rice | 356/28.5 |
| 6,469,778 B2 | * | 10/2002 | Asaka et al. | 356/28.5 |
| 6,490,047 B2 | * | 12/2002 | Siu | 356/502 |

OTHER PUBLICATIONS

Michael W. Berns, Laser Scissors and Tweezers, Apr. 1998, Scientific American, pp. 62–67.

* cited by examiner

Primary Examiner—Hezron Williams
Assistant Examiner—Jacques Saint-Surin

(57) ABSTRACT

A micro-doppler microscope for providing an indication of the vibration of a target. An input laser beam is received by a beamsplitter that divides the input laser beam into a transmitted portion and a reflected portion. A first focusing optics focuses the transmitted portion onto a target, the target scattering a scattered portion thereof. This scattered portion is directed back through the first focusing optics, and reflected off the beamsplitter. Second focusing optics is positioned to receive the scattered portion from the beamsplitter and for focusing the scattered portion. A planar mirror is positioned to reflect the reflected portion of the input laser beam back through the beamsplitter and through the second focusing optics so that it is focused. A fast photodetector receives the focused scattered portion from the second focusing optics and the focused reflected portion from the second focusing optics. Both focused portions are focused on the same spot on the fast photodetector. Coherent mixing of the focused portions occurs at the fast photodetector, the frequency modulation of the scattered portion thereby providing an indication of the vibration of the target. The indication is provided as an output signal from the fast photodetector.

21 Claims, 1 Drawing Sheet

MICRO-DOPPLER MICROSCOPE

BACKGROUND OF THE INVENTION

1. Field of the Invention

This invention relates to the detection of vibrations of a target and more particularly to the use of micro-doppler technology for detecting vibrations in very small objects.

2. Description of the Related Art

Research on the use of lasers to hold and manipulate living cells using focused laser beams has advanced rapidly in recent years and today laser "tweezers" and "scissors" are significant tools in the study of living cells. This technology is now also being used in genetic engineering as well, where chromosomes are held and cut. Another application has been in fertility research where egg cell surfaces are prepared to facilitate fertilization. This technology is well described in a Scientific American article (August 1998) entitled Laser Scissors and Tweezers by Dr. Michael Berns of the University of California at Irvine. As described in the article, laser beams are focused to volumes as small as 0.25 micrometers, which permits individual organelles (e.g., ribosomes or mitochondria) to be held and manipulated. However, the capability to measure the vibrational spectrum of cellular structures simply does not exist at present.

The detection of target vibrations for the purpose of non-cooperative classification by coherent micro-doppler ladar is known. For example, U.S. Pat. No. 5,847,817, issued to Zediker et al, discloses a method for extending the effective range and sensitivity of a micro-doppler ladar system by increasing its effective coherence length. U.S. Pat. No. 5,847,816, also issued to Zediker et al, discloses a micro-doppler ladar system constructed primarily with fiber optic elements. U.S. Pat. No. 5,867,257, issued to Rice et al, discloses a battlefield personal threat detection system for identifying and analyzing vibrations corresponding to an immutable characteristic of a target of interest such as the heartbeat of an enemy soldier or the respiration process of the soldier. However, micro-doppler technology has not been extended for use with very small objects, such as cellular structures.

SUMMARY

The present invention is a micro-doppler microscope for providing an indication of the vibration of a target. An input laser beam is received by a beamsplitter that divides the input laser beam into a transmitted portion and a reflected portion. A first focusing optics focuses the transmitted portion onto a target, the target scattering a scattered portion thereof. This scattered portion is directed back through the first focusing optics, and reflected off the beamsplitter. Second focusing optics is positioned to receive the scattered portion from the beamsplitter and for focusing the scattered portion. A planar mirror is positioned to reflect the reflected portion of the input laser beam back through the beamsplitter and through the second focusing optics so that it is focused. A fast photodetector receives the focused scattered portion from the second focusing optics and the focused reflected portion from the second focusing optics. Both focused portions are focused on the same spot on the fast photodetector. Coherent mixing of the focused portions occurs at the fast photodetector, the frequency modulation of the scattered portion thereby providing an indication of the vibration of the target. The indication is provided as an output signal from the fast photodetector. This output signal may be directed to signal processing electronics where it may presented, for example, on a display as an indication of motion. Alternatively, the signal may undergo spectrographic analysis.

DETAILED DESCRIPTION OF THE INVENTION

Figure 1:
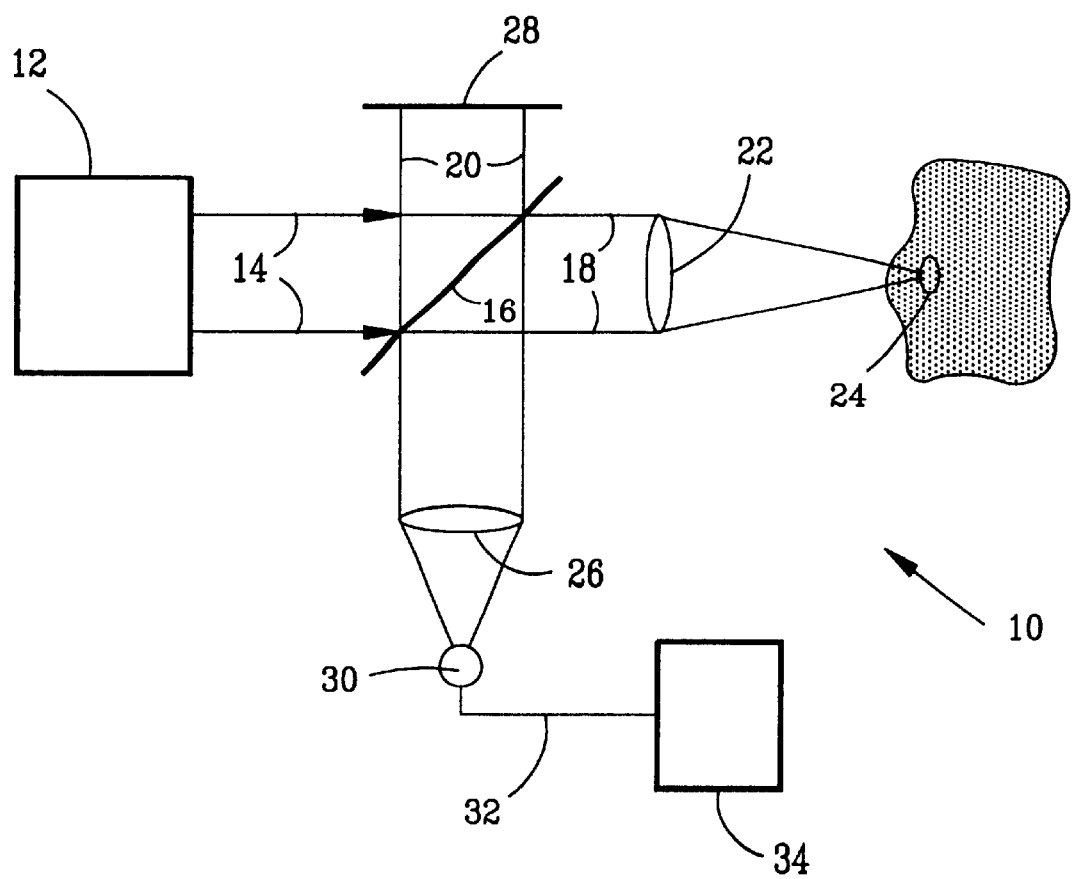
FIG. 1 is a schematic view of a preferred embodiment of the micro-doppler microscope of the present invention.

Referring to the drawings and the characters of reference marked thereon FIG. 1 illustrates a preferred embodiment of the present invention, designated generally as 10. The micro-doppler microscope 10 includes a laser beam source 12 for providing an input laser beam 14. A beamsplitter 16 receives the input laser beam 14 and divides the input laser beam into a transmitted portion 18 and a reflected portion 20. A first focusing optics 22 focuses the transmitted portion 18 onto a target 24. The target 24 scatters a scattered portion thereof that is directed back through the first focusing optics 22 and reflected off of the beamsplitter.

A second focusing optics 26 is positioned to receive the scattered portion from the beamsplitter and focuses that scattered portion. A planar mirror 28 is positioned to reflect the reflected portion of the input laser beam back through said beamsplitter 16 and through the second focusing optics 26 and thus being focused.

A fast photodetector 30 receives the focused scattered portion from the second focusing optics 26 and the focused reflected portion from the second focusing optics 26. Both of these focused portions are focused on the same spot on the fast photodetector 30. The2 coherent mixing of the focused portions occurs at the fast photodetector 30. The frequency modulation of the scattered portion provides an indication of the vibration of the target, the indication being provided as an output signal 32 from the fast photodetector 30 which is processed by signal processing means 34. The signal processing means 34 may comprise, for example, signal processing electronics that provides a display showing the vibration or a spectrographic analyzer. The fast photodetector must operate at a sufficiently high frequency to accommodate the vibrations present, generally on the order of 10 GHz or more. Examples of such fast photodetectors include are readily found in *Laser Focus Buyer's Guide*.

Typically, the laser power will be low, e.g., a few milliwatts, but must be of high optical beam quality to facilitate efficient heterodyne detection. The diffraction limited spot size on the target 24 is inversely proportional to wavelength, so higher spatial resolution is achieved with shorter wavelength. Likewise, the Doppler shift in the frequency of the light scattered back from the target is inversely proportional to the incident wavelength. Thus, the sensitivity of the microscope 10 to detect small motion is enhanced at shorter wavelengths.

The beamsplitter 16 and focusing optics 22, 26 are of conventional design for high quality microscope construction. For example, the focusing optics 22, 26 may comprise a commercially available compound microscope objective lens, or equivalent, that is antireflective coated for the signal wavelength. The beamsplitter 16 may be of a conventional type, for example, an optically flat plate of transmissive glass upon which is deposited a dielectric film designed to reflect a fixed portion of the incident optical power, e.g., 50%.

With respect to the use of this microscope 10 for measuring the vibration of cellular structures, light scattered back from these focal volumes will generally be frequency modulated by any motion occurring therein. Using coherent optical receiver techniques, this back-scattered light can be detected and the motions within the focal volume measured. Because the photodetector area is approximately matched in size to the re-imaged diffraction-limited spot on the target, only light that is light scattered from precisely the target volume will be collected by the microscope optics and brought to focus on the sensitive area of the photodetector. This confocal property allows the present invention to measure only the vibrations in the target focal volume.

Measuring the vibration of cellular structures involves use of a laser source 12 that provides a visible or near infrared laser beam. The potential for such a use is very significant. For example, when enzymes function, calcium channels open, or messenger RNA is assembled on an opened DNA strand, there are significant mechanical disturbances that are input to the structures involved and the surrounding medium. The rate of opening of said channels may indicate the efficacy of a new "channel-blocker", which may be very important to a pharmaceutical laboratory. The propagation of a nerve impulse in an axon will produce deformation that can be detected by the present invention and thereby provide a non-invasive method to monitor the function of living nerve cells. In another example, internal cellular structures, i.e. organelles, can be perturbed by a pulsed laser delivered through the microscope optical system to the focal volume and the elastic response monitored.

Examples of cellular structures that may be analyzed may include, for example, cytoplasmic constituents—namely, mitochondria (the energy factories of cells) and such structures as microfilaments, microtubules and centrosomes—involved in maintaining cellular architecture and transporting molecules within cells. Other structures may include organelles of the nucleus, such as chromosomes and the mitotic spindle that segregates chromosomes during cell division.

This microscope 10 may be also used for measuring localized vibrations and time-dependent deformations of electronic microcircuit components. The laser source 12 in this case should provide a short wavelength, e.g., ultraviolet, laser beam in order to provide high spatial resolution and mechanical sensitivity. The electrical functioning of microcircuit components can be optically detected through mechanical responses, providing, for example, a non-invasive method to monitor transmitted data or logic gate operation.

The curing of polymer resins likewise results in mechanical effects within very small volumes, and this invention can be effective to monitor curing. In such an application, use of a pulsed laser delivered through the microscope optical system or an ultrasonic source could provide a known mechanical input, the response to which would indicate the degree of curing. In general, monitoring the microscopic response of a medium or structure to a known acoustic or mechanical input provides valuable information on the physical properties of materials, devices or structures.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. A micro-doppler microscope for providing an indication of the vibration of a target, comprising:

means for providing an input laser beam;

a beamsplitter for receiving said input laser beam, said beamsplitter dividing the input laser beam into a transmitted portion and a reflected portion;

first focusing optics for focusing said transmitted portion onto a target, the target scattering a scattered portion thereof, said scattered portion being directed back through said first focusing optics, and reflected off said beamsplitter;

second focusing optics being positioned to receive said scattered portion from said beamsplitter and for focusing said scattered portion;

a planar mirror being positioned to reflect said reflected portion of the input laser beam back through said beamsplitter and through said second focusing optics and thus being focused; and, a fast photodetector for receiving the focused scattered portion from the second focusing optics and the focused reflected portion from the second focusing optics, both focused portions being focused on the same spot on the fast photodetector, wherein coherent mixing of said focused portions occurs at the fast photodetector, the frequency modulation of said scattered portion thereby providing an indication of the vibration of the target, said indication being provided as an output signal from said fast photodetector.

2. The micro-doppler microscope of claim 1, further including signal processing electronics for processing said output signal from said fast photodetector.

3. The micro-doppler microscope of claim 2, wherein said signal processing electronics comprises a display for presenting said indication of the vibration of the target.

4. The micro-doppler microscope of claim 2, wherein said signal processing electronics comprises a spectrographic analyzer.

5. The micro-doppler microscope of claim 1, wherein said means for providing an input laser beam provides a visible laser beam.

6. The micro-doppler microscope of claim 1, wherein said means for providing an input laser beam provides a near infrared laser beam.

7. The micro-doppler microscope of claim 1, wherein said means for providing an input laser beam provides a pulsed laser beam.

8. The micro-doppler microscope of claim 1, wherein said means for providing an input laser beam provides an ultraviolet laser beam.

9. A micro-doppler microscope for providing an indication of the vibration of a cellular structure, comprising:

means for providing an input laser beam;

a beamsplitter for receiving said input laser beam, said beamsplitter dividing the input laser beam into a transmitted portion and a reflected portion;

first focusing optics for focusing said transmitted portion onto a cellular structure, the cellular structure scattering a scattered portion thereof, said scattered portion being directed back through said first focusing optics, and reflected off said beamsplitter;

second focusing optics being positioned to receive said scattered portion from said beamsplitter and for focusing said scattered portion;

a planar mirror being positioned to reflect said reflected portion of the input laser beam back through said beamsplitter and through said second focusing optics and thus being focused; and, a fast photodetector for receiving the focused scattered portion from the second focusing optics and the focused reflected portion from the second focusing optics, both focused portions being focused on the same spot on the fast photodetector, wherein coherent mixing of said focused portions occurs at the fast photodetector, the frequency modulation of said scattered portion thereby providing an indication of the vibration of the cellular structure, said indication being provided as an output signal from said fast photodetector.

10. The micro-doppler microscope of claim 9, further including signal processing electronics for processing said output signal from said fast photodetector.

11. The micro-doppler microscope of claim 10, wherein said signal processing electronics comprises a display for presenting said indication of the vibration of the target.

12. The micro-doppler microscope of claim 10, wherein said signal processing electronics comprises a spectrographic analyzer.

13. The micro-doppler microscope of claim 9, wherein said means for providing an input laser beam provides a visible laser beam.

14. The micro-doppler microscope of claim 9, wherein said means for providing an input laser beam provides a near infrared laser beam.

15. The micro-doppler microscope of claim 9, wherein said means for providing an input laser beam provides a pulsed laser beam.

16. A micro-doppler microscope for providing an indication of the vibration of an electronic microcircuit component, comprising:

means for providing an input laser beam;

a beamsplitter for receiving said input laser beam, said beamsplitter dividing the input laser beam into a transmitted portion and a reflected portion;

first focusing optics for focusing said transmitted portion onto an electronic microcircuit component, the electronic microcircuit component scattering a scattered portion thereof, said scattered portion being directed back through said first focusing optics, and reflected off said beamsplitter;

second focusing optics being positioned to receive said scattered portion from said beamsplitter and for focusing said scattered portion;

a planar mirror being positioned to reflect said reflected portion of the input laser beam back through said beamsplitter and through said second focusing optics and thus being focused; and, a fast photodetector for receiving the focused scattered portion from the second focusing optics and the focused reflected portion from the second focusing optics, both focused portions being focused on the same spot on the fast photodetector, wherein coherent mixing of said focused portions occurs at the fast photodetector, the frequency modulation of said scattered portion thereby providing an indication of the vibration of the electronic microcircuit component, said indication being provided as an output signal from said fast photodetector.

17. The micro-doppler microscope of claim 16, further including signal processing electronics for processing said output signal from said fast photodetector.

18. The micro-doppler microscope of claim 17, wherein said signal processing electronics comprises a display for presenting said indication of the vibration of the target.

19. The micro-doppler microscope of claim 18, wherein said signal processing electronics comprises a spectrographic analyzer.

20. The micro-doppler microscope of claim 1, wherein said means for providing an input laser beam provides an ultraviolet laser beam.

21. A method for providing an indication of the vibration of a target, comprising:

providing an input laser beam;

dividing said input laser beam, via a beamsplitter, into a transmitted portion and a reflected portion;

focusing said transmitted portion onto a target utilizing first focusing optics, the target scattering a scattered portion thereof, said scattered portion being directed back through said first focusing optics, and reflected off said beamsplitter;

utilizing second focusing optics to receive said scattered portion from said beamsplitter and for focusing said scattered portion;

reflecting said reflected portion of the input laser beam back through said beamsplitter and through said second focusing optics and thus being focused; and, utilizing a fast photodetector for receiving the focused scattered portion from the second focusing optics and the focused reflected portion from the second focusing optics, both focused portions being focused on the same spot on the fast photodetector, wherein coherent mixing of said focused portions occurs at the fast photodetector, the frequency modulation of said scattered portion thereby providing an indication of the vibration of the target, said indication being provided as an output signal from said fast photodetector.

* * * * *